United States Patent [19]

Gallagher

[11] Patent Number: 4,674,016
[45] Date of Patent: Jun. 16, 1987

[54] LIGHTING APPARATUS

[76] Inventor: P. Christopher J. Gallagher, Electronic Advanced Systems Corp., 5 Portland Rd., West Conshohocken, Pa. 19428

[21] Appl. No.: 840,441

[22] Filed: Mar. 17, 1986

[51] Int. Cl.$^4$ .............................................. F21V 1/00
[52] U.S. Cl. ................................... 362/240; 362/247; 362/217
[58] Field of Search ............... 362/240, 241, 247, 296, 362/297, 346, 349, 360, 217, 221, 222, 223, 224

[56] References Cited

U.S. PATENT DOCUMENTS

| 4,317,069 | 2/1982 | Burgess | 315/227 |
| 4,336,576 | 6/1982 | Crabtree | 362/246 |
| 4,388,675 | 6/1983 | Lewin | 362/247 |

FOREIGN PATENT DOCUMENTS 1186366  4/1985  Canada ................................ 315/29

OTHER PUBLICATIONS

3M Energy Control Products Brochure 70-0701-07-84-5 "Silverlux Fluorescent Reflectors Turn on Energy Savings . . . " Brayer Lighting, Inc., Retroflect Reflectors.

Primary Examiner—Raymond A. Nelli
Attorney, Agent, or Firm—Howson and Howson

[57] ABSTRACT

Efficiency of a lighting apparatus containing one or more pairs of fluorescent tubes is improved by eliminating one tube of each pair, installing a new pair of sockets positioned to hold the remaining tube at a location in a vertical plane between the original tube locations, positioning a new reflector in the fixture so that it reflects light from the repositioned remaining tube, and making electrical connections to the new sockets. This can be done by making connections to original sockets. The reflector is supported by spring clips held in place by the same fasteners which secure the new sockets. The spring clips are positioned to allow installation and removal of the new reflector without loosening the fasteners.

11 Claims, 9 Drawing Figures

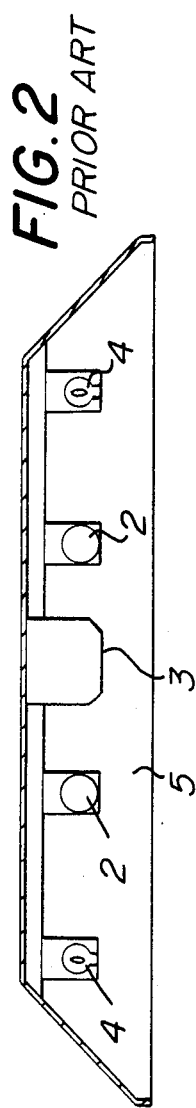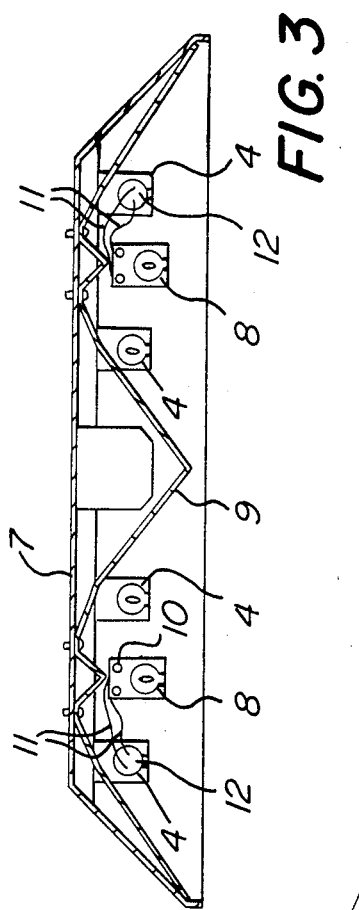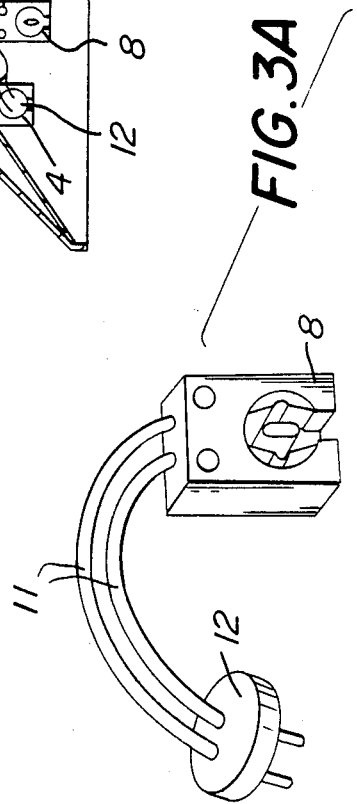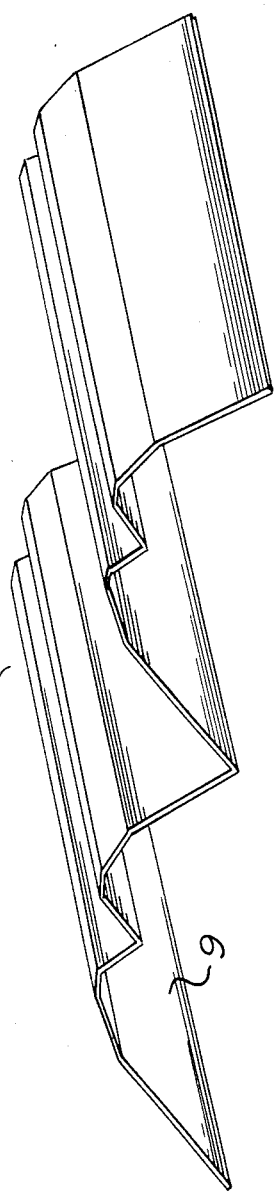

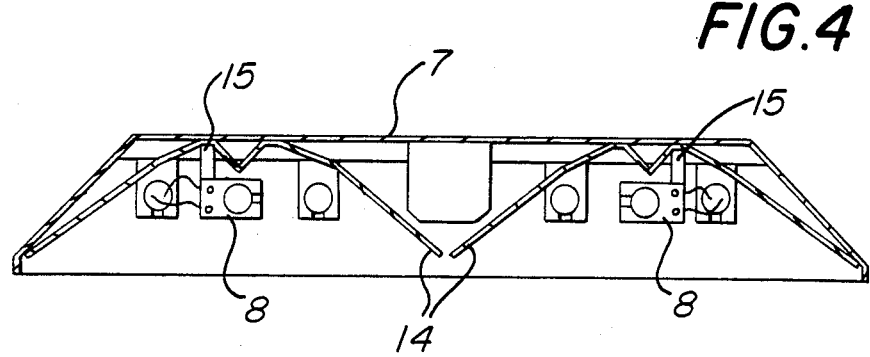
FIG.4
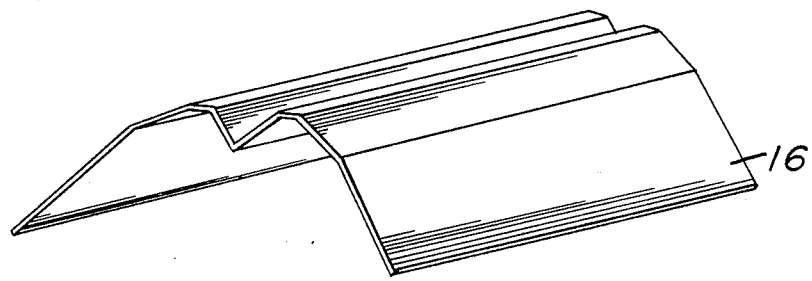
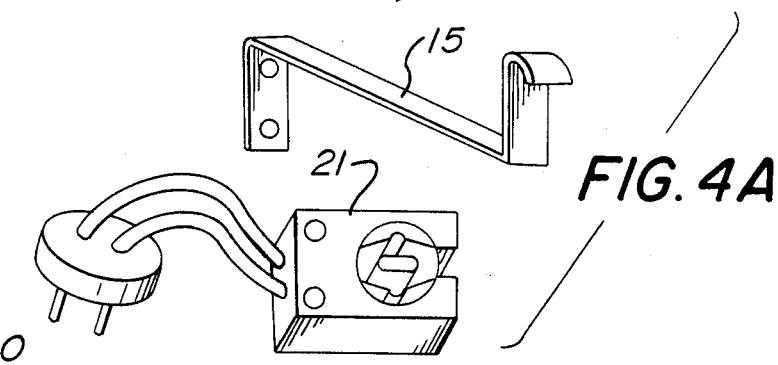
FIG.4A
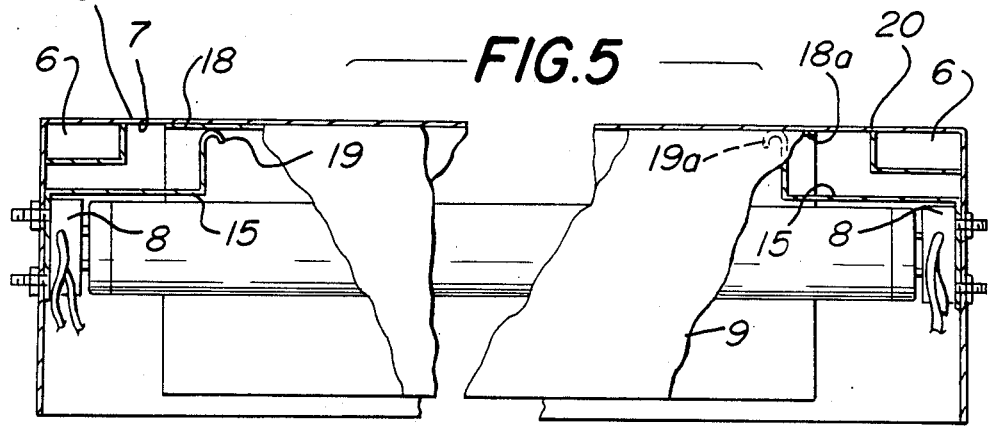
FIG.5

LIGHTING APPARATUS

BACKGROUND OF THE INVENTION

Light sources in wide use in commercial and other premises contain two or more parallel fluorescent tubes, each generally two, four or eight feet in length. The fluorescent tubes are commonly supported by sheet metal housings or frames. Light output from the apparatus is commonly of low overall efficiency. A major contributing factor to the low efficiency of many existing light sources is that the housing or frame of the fluorescent tubes is constructed of sheet metal having a white painted or porcelain finish. As a result, an unnecessarily high proportion of the light emitted from the fluorescent tubes which impinges on the housing surfaces is absorbed, or diffusely reflected, rather than reflected out of the apparatus. By improving the design of the surfaces adjacent to the fluorescent tubes it is possible to increase the efficiency of the lighting apparatus so that one or more of the tubes may be removed with little or no loss in useful light output. By so doing, reduced energy consumption and lower costs will result.

SUMMARY OF THE INVENTION

The present invention is directed towards improving the efficiency of existing lighting apparatus. In the case of a four foot long by two foot wide lighting apparatus or troffer designed for installation in ceilings and containing four fluorescent tubes each four feet long, for example, the purpose is to remove two of the tubes and by installing one or more suitably designed high reflectivity surfaces in the troffer, to improve the efficiency of the apparatus so that little or no loss in useful light output results from the removal of said light sources.

In a conventional four tube troffer, two fluorescent tubes are disposed on either side of a compartment centered on the long axis of the apparatus which contains the electrical ballasts used to control power consumption of the tubes. In the present invention, a means is provided on each of the two sides of the ballast compartment to mount one tube in place of the preexisting pair of tubes in a location between those of the preexisting tubes. By relocating the tubes in this way, and by installing one or more suitably designed highly reflective surfaces, a converted lighting apparatus with highly efficient, balanced light output is achieved which is of considerable utility.

A principal object of the present invention is to improve the useful light output efficiency of existing lighting apparatus. Another principal object of the invention is to reduce the number of light sources in existing apparatus.

A further object of the invention is to install single light sources between pairs of preexisting light sources. Another object of the invention is to improve such apparatuses wherein the light sources are tubular. A further object of the invention is to improve such apparatuses wherein the tubular light sources are fluorescent. Yet another object of the invention is to improve existing apparatuses without making changes to the existing electrical and physical design so as not to invalidate warranties or certifications of safe performance provided by the manufacturer of said apparatuses. A further object of the invention is to improve existing apparatuses using material and methods which allow easy and safe in situ conversion. A further object of the invention is to retain easy access to the ballast compartment of apparatuses after conversion has been made. A still further object of the invention is to provide a lighting apparatus conversion which fits a major proportion of the various existing lighting apparatuses.

BRIEF DESRIPTION OF THE DRAWINGS

FIG. 2 is a sectional schematic view of one end of the lighting apparatus of FIG. 1;

FIG. 3 is a sectional schematic view of the lighting apparatus of FIGS. 1 and 2 converted in accordance with the invention;

FIG. 3A shows schematically, in perspective view, a new reflector and socket used to effect the conversion of FIG. 3;

FIG. 4 is a schematic view of the lighting apparatus converted in accordance with an alternative embodiment of the invention;

FIG. 4A shows schematically, in perspective view, a new reflector, socket and clip used to effect the conversion of FIG. 4;

FIG. 5 is a schematic longitudinal section through a lighting apparatus showing a preferred method of installing the new fluorescent tube sockets and clips to support and position the reflector and sockets;

DESCRIPTION OF THE PREFERRED EMBODIMENTS

Figure 1:
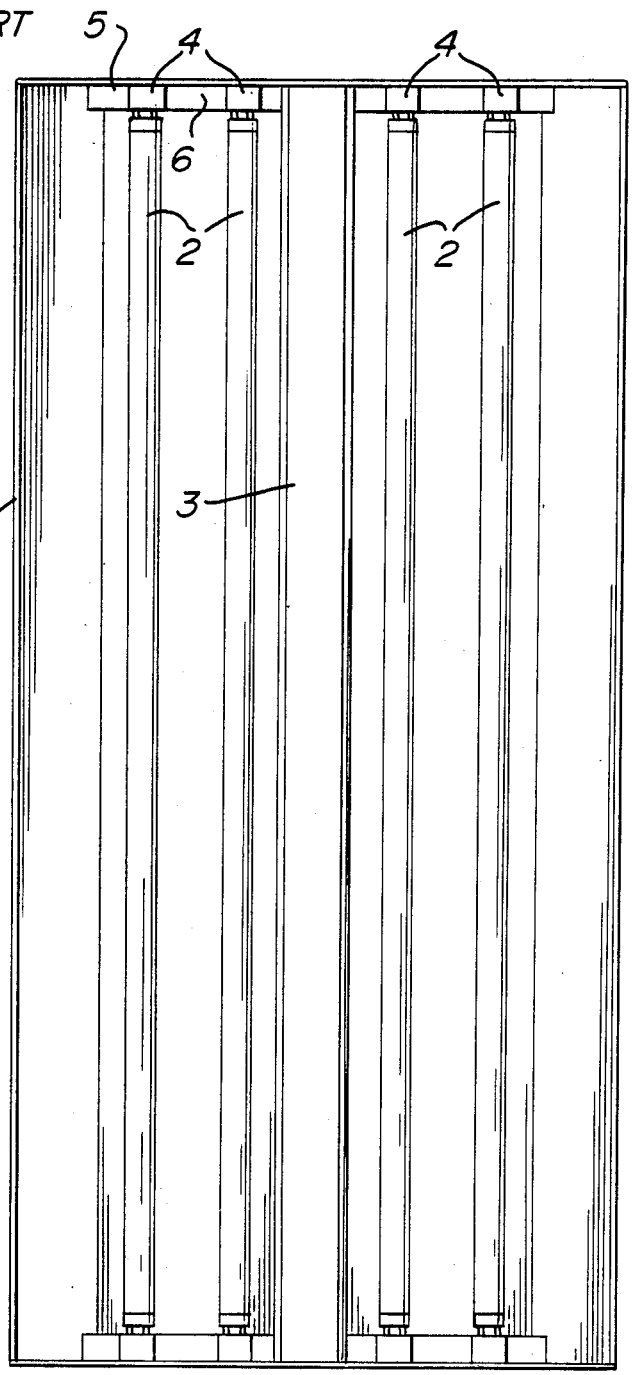
FIG. 1 is a schematic bottom plan view illustrating a typical lighting apparatus with which the present invention is principally concerned.

FIG. 1 shows a typical four foot long by two foot wide troffer, with a sheet metal, white-coated housing 1, and containing four fluorescent tubes 2, each four feet in length. The ballast compartment 3 lies along the center of the fixture. Sockets 4 at end 5 of the fixture support and provide electrical power to the fluorescent tubes. Similar sockets are provided at the opposite end. Wires bringing power to the sockets lie behind a protective sheet metal wire cover 6.

FIG. 2 shows in detail a typical configuration of the end wall 5 of a four-tube fluorescent fixture. The positions of the fluorescent tubes 2 nearest to the ballast compartment 3 are indicated. The outermost fluorescent tubes are removed to show the sockets 4. Conversion of a four-tube fixture of this type to energy-saving operation with only two inner fluorescent tubes, is practiced in the prior art, as represented for example by Crabtree U.S. Pat. No. 4,336,576. In Crabtree, one fluorescent tube of each pair is removed, and a new reflector is installed which is specially designed to produce relatively uniform illumination of a diffuser plate despite the removal of one-half of the total number of fluorescent tubes. A prevailing difficulty in such conversions will be appreciated from FIG. 2 of the present application. In many fixtures as in FIG. 2, there is too little space between the positions of the fluorescent tubes and the top and other surfaces of the housing to install a reflector which provides uniform and efficient light output across the entire surface area of the lighting apparatus.

In an embodiment of the present invention as shown in FIG. 3, uniform and efficient light output is achieved by installing two fluorescent tubes in sockets 8 newly installed between the existing pairs of sockets 4. The preferred location of new sockets 8 relative to the existing sockets 4, relative to the top 7 of the housing, and relative to the other internal features of a fixture will vary depending upon the precise dimensions and layout of the particular lighting apparatus which is being converted. Likewise, the detailed configuration of the reflector 9 which is installed as part of the conversion influences the preferred location of the new sockets as also does the pattern of light which the converted fixture is intended to provide. In a preferred embodiment of this invention, the new sockets are located such that fluorescent tubes mounted therein are midway between the tubes which had been mounted before conversion in the preexisting pairs of sockets, further, the new sockets are placed such that tubes mounted therein are at the same distance from the top 7 of the housing as were the four tubes prior to conversion. Where desired, however the positions of the new sockets can be such that the tubes therein are either closer to or further from the top surface 7 of the housing. The present invention provides a measure of flexibility in the positioning of the fluorescent tubes to suit the requirements of the particular conversion.

Figure 6:
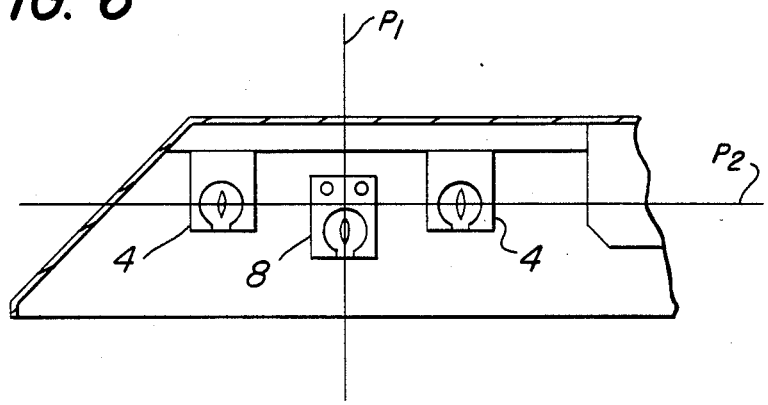
FIG. 6 is a schematic view illustrating imaginary reference planes by which the relative positions of original and new sockets are described.
Figure 7:
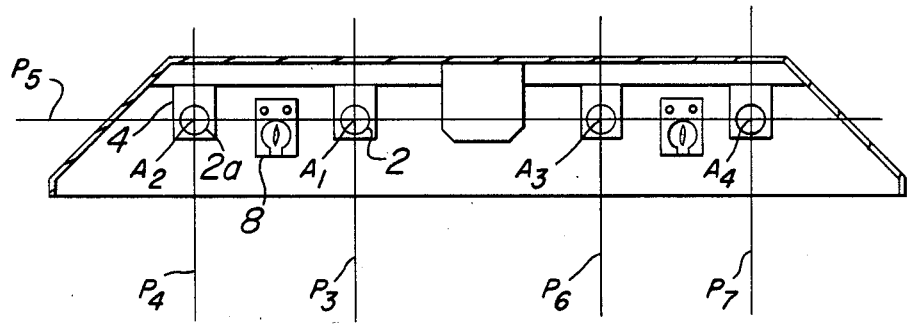
FIG. 7 is a schematic view illustrating an alternative set of reference planes.

In general, as shown in FIG. 6, at each end of the lighting apparatus, the new sockets 8 for each new tube are positioned so as to be intersected by a first imaginary plane
  located between the original sockets 4, and perpendicular to a second imaginary plane
    intersecting the original sockets. Thus the new sockets are generally between the old sockets, but may be located at the level of the old sockets, or somewhat above or below that level. Stating the relationship between new and old sockets another way with reference to FIG. 7, the original tubular lamps 2 and 2a can be thought of as located on parallel $A_1$ and $A_2$ axes lying respectively in imaginary parallel planes $P_3$ and $P_4$ which are both perpendicular to a plane $P_5$ defined by said axes. The new sockets 8 for the new tubular bulb are mounted on a line parallel to said parallel axes $A_1$ and $A_2$ and between said imaginary parallel planes $P_3$ and $P_4$. In the case of a four tube fluorescent lighting apparatus, as in FIG. 7, there are four original fluorescent tubes in a row on parallel axes $A_2$, $A_1$, $A_3$, and $A_4$ all lying in plane $P_5$ and in imaginary parallel planes $P_4$, $P_3$, $P_6$ and $P_7$. One of the new sockets 8 is mounted between planes $P_4$ and $P_3$ and the other is mounted between planes $P_6$ and $P_7$.

In the embodiment of the invention shown in FIG. 3 the new sockets 8 are mounted in the same manner as the preexisting sockets, so that the tubes are insertable from below. The new sockets are held in position by means of one or more screws 10 or other mechanical connectors inserted through holes in the body of the new sockets, or by means of contact cement, or by any other suitable means.

A feature of the present invention is that power is brought to the new sockets 8 through cables 11 to which plugs 12 are attached. The plugs are inserted in preexisting sockets 4 and make electrical contact therewith. To complete the electrical circuit to the new sockets 8 correctly, plugs 12 must be inserted at opposite ends of the fixture in sockets which previously held opposite ends of an individual fluorescent tube.

In a preferred embodiment of the invention, the new sockets 8 are symmetrical about their long axis so that they may make connection with equal facility to socket 4 which is to their left, as in the left side reflective compartment of the fixture shown in FIG. 3, or to their right as in the right side reflective compartment of the fixture shown in FIG. 3.

Electrical connections can be made to the new sockets in other ways. For example, wires originally connected to deliver electric current to original sockets can be disconnected from the original sockets and reconnected to the new sockets, either directly, or through additional lengths of wire connected from the original wires to the new sockets. Alternatively, the new sockets can be connected directly to the ballast and to the line. Still another way to make electrical connections to a socket is to remove one of the adjacent original sockets, and connect the new socket to the wiring behind the wire cover through the opening exposed when the original socket is removed.

A feature of the reflector 9 in the embodiment of the invention in FIG. 3 is that its surface is highly reflective. The reflector in this embodiment is a single sheet of material, with or without a reflective coating or film laminated or otherwise attached thereto, shaped suitably to fit within the size constraints of the existing fixture and designed to yield high efficiency and the required distribution of light output. The reflector is attached to the top surface 7 of the fixture, or to any other convenient part of the housing or frame of the lighting apparatus. Attachment may be by any convenient mechanical or chemical means. The reflector can even be attached, by means of clips, directly to the newly mounted fluorescent tube. The reflective surface may feature discrete bends in otherwise plane surfaces, or may vary in curvature from point to point without discontinuities, or both.

In FIG. 3A the parts used to convert the fixture shown schematically in FIG. 3 are illustrated. In the example of converting a four-tube fixture to operation with two tubes, parts required are one reflector 9, four new socket units each comprising a socket 8, a cable 11 and a plug 12, and suitable means of connection, not illustrated. The socket 8 is preferably provided with through holes for fasteners, such as sheet metal screws, which secure the socket to a supporting surface in the lighting apparatus.

In FIG. 4 a further preferred embodiment of the invention is shown. Each reflective compartment of the fixture is fitted with a reflector 14. Further, a clip 15 is installed at each new socket 8 by the same mechanical or chemical connectors used to attach the new sockets to the end walls of the fixture. The clips are positioned so that they press with moderate force against the top 7 of the fixture, in which position they serve to hold in place the newly installed reflective material. In this preferred embodiment of the invention, the clips 15 fulfill several functions of considerable utility.

Securing the clips in position with the same means of connection used to attach the new sockets to the end walls of the fixture minimizes the number of connections required for conversion, thereby saving the effort, time and cost of making such further connections. Further, in an embodiment where screws are used to make the installation, use of the clips eliminates the tiring and time consuming requirement of working above one's head drilling in the top surface of the fixture. Further, the predetermined size of the clips serves to position the reflective material precisely relative to the newly installed fluorescent tubes, so that no deviation from the results designed for can arise from improper installation.

Since the reflective material is held in position by pressure from clips exerted against the reflector pressed against the top surface of the fixture, rather than by more permanent other mechanical or chemical means, a number of further advantages arise. For example, the position of the reflective material can be readily adjusted during the course of installation for optimum fit. In the case of reflectors on the left and right hand sides of the ballast compartment which are required to meet precisely along their entire lengths, the reflectors can easily be so adjusted. Also, the ease with which the reflective material can be removed from the retaining clips facilitates access to the ballast compartment, which access is occasionally required to replace failed ballasts.

FIG. 4A shows the materials used to convert the fixture in FIG. 4. In the example of converting a four-tube fixture to operation with two tubes, materials required are two reflectors 16, four plug/wire/socket units 16, four clips 15, and four or eight screws, rivets or other fasteners (not shown). In a preferred embodiment, the reflectors 17 have flat surfaces in those areas where the clips make contact.

In the embodiment of the invention shown in FIG. 4, the new sockets 8 are mounted for sideways tube insertion whereas the preexisting sockets are mounted for vertical tube insertion. An advantage of this embodiment is that more space is available to raise or lower the position of the sideways mounted sockets relative to the top surface 7 of the housing.

FIG. 5 illustrates the disposition in a preferred embodiment of the present invention of new sockets 8, clips 15, wire covers 6, the top surface 7 of the fixture and the reflective material 9. To facilitate installation and removal of the reflector, the relationships between the overall length of the reflector from end 18 to end 18a, the distance between the outer limits 19 and 19a of the clips 15 and the distance between the points 20 and 20a where the wire covers meet the top surface of the fixture, are important and must bear correct relationship one to another. In the preferred embodiment there is sufficient distance between points 20 and 19 and between points 20a and 19a to allow the reflector to slide up against the wire cover 6 at one end of the fixture, and thereby become completely free of the clip at the other end. In this way, insertion and removal of the reflective material is readily accomplished.

While preferred embodiments of the apparatus of the invention have been disclosed, modifications may be made thereto by a person skilled in the art without departing from the spirit of this invention, and it is intended to protect by Letters Patent all forms of the invention falling with the scope of the following claims.

I claim:

1. A method of modifying a lighting apparatus comprising at least one pair of original sockets mounted in spaced relationship to each other, and a pair of light sources, each of said light sources being at least partly supported by a separate socket of said pair of original sockets, each of said original sockets being connected through original wiring connections to a source of electric current, and each light source of said pair being connected to said source of electric current through the original socket by which it is at least partly supported, said method comprising the steps of:
    (a) removing both light sources from said original sockets;
    (b) leaving at least one of said original sockets in its original position and connected to said original wiring connections;
    (c) securing a new socket in the lighting apparatus at a position such that the new socket is intersected by a first imaginary plane located between the positions of said original sockets said first imaginary plane being perpendicular to a second imaginary plane intersecting the positions of the original sockets;
    (d) electrically connecting said new socket to said original wiring connections by connecting said new socket through an adapter plug to one of the original sockets in its original position; and
    (e) installing a light source in said new socket;
    whereby a single light source is substituted for said pair of light sources.

2. The method in accordance with claim 1 in which said new socket is secured in the lighting apparatus by fastening means, and in which reflective means is secured in the lighting apparatus at least in part by the same fastening means at a position to reflect light from said single light source installed in said new socket.

3.. The method in accordance with claim 1 in which said new socket is secured in the lighting apparatus at least in part by fastening means; in which reflector support means is also secured in the lighting apparatus at least in part by the same fastening means; and including the steps of positioning reflective means so as to reflect light from a single light source mounted in the new socket, and supporting said reflective means at least in part on said reflector support means.

4. The method in accordance with claim 3 in which said reflector support means is a retaining clip arranged to hold the reflective means against a surface of the lighting apparatus by spring pressure, and in which the spring pressure is such as to allow positional adjustment of the reflective means, and the retaining clip is positioned to allow installation and removal of the reflective means without loosening said fastening means.

5. A method of modifying a four tube fluorescent lighting apparatus comprising four fluorescent tubes arranged in a row on parallel axes lying in first, second, third and fourth imaginary parallel planes, said planes being perpendicular to a fifth plane in which said axes lie, a first pair of said tubes lying adjacent to each other respectively in the first and second planes, and a second pair of said tubes lying adjacent to each other respectively in the third and fourth planes, and eight original sockets, each of said tubes being supported by two of said original sockets, there being one of said original sockets at each end of each tube, each of said original sockets being connected to a source of electric current through original wiring connections and each tube being connected to said source of electric current through the original sockets by which it is supported, said method comprising the steps of:
    (a) removing said tubes from said original sockets;
    (b) leaving the original sockets at opposite ends of at least one tube from each of said first and second pairs of tubes in their original positions and connected to said original wiring connections, whereby there are at least four remaining original sockets;

(c) securing four new sockets in the lighting apparatus so that the sockets of a first pair of new sockets are located opposite each other on a line parallel to said parallel axes and between said first and second imaginary parallel planes and so that the other two new sockets are located opposite each other on a line parallel to said parallel axes and between said third and fourth imaginary parallel planes;

(d) electrically connecting said new sockets to said original wiring connections by connecting each of said new sockets through an adapter plug to one of said remaining original sockets; and (e) installing a first fluorescent tube in said first pair of new sockets and installing a second fluorescent tube in said other two new sockets;

whereby two fluorescent tubes are substituted for the four tubes originally in the lighting apparatus.

6. The method in accordance with claim 5 in which said new sockets are secured in the lighting apparatus by fastening means, and in which reflective means is secured in the lighting apparatus at least in part by said fastening means and positioned to reflect light from said two fluorescent tubes installed in the new sockets.

7. The method in accordance with claim 5 in which said new sockets are secured in the lighting apparatus at least in part by fastening means; in which reflector support means is also secured in the lighting apparatus at least in part by said fastening means; and including the steps of positioning reflective means so as to reflect light from said two fluorescent tube installed in the sockets, and supporting said reflective means at least in part on said reflector support means.

8. The method in accordance with claim 7 in which said reflector support means comprises retaining clips arranged to hold the reflective means against surfaces of the lighting apparatus by spring pressure, and in which the spring pressures are such as to allow positional adjustment of the reflective means, and the retaining clips are positioned to allow installation and removal of the reflective means without loosening said fastening means.

9. A lighting apparatus comprising:
a source of electric current;
a pair of sockets mounted in spaced relationship to each other;
a third socket located so as to be intersected by a first imaginary plane between said pair of sockets and perpendicular to a second imaginary plane intersecting said pair of sockets;
means connecting at least one socket of said pair to said source of electric current; reflective means positioned to reflect light from a light source mounted in said third socket;
said pair of sockets and said third socket holding only one light source, and said one light source being mounted on and electrically connected to said third socket; and
means comprising an adapter plug connected to one socket of said pair for connecting said third socket, through said plug, to said source of electric current;
said lighting apparatus including a support and fastening means and in which said third socket means is attached to said support by said fastening means and in which the reflective means is attached to the support at least in part by the said fastening means.

10. A lighting apparatus according to claim 9 having reflector supporting means for supporting said reflective means, said reflector supporting means being attached to said support at least in part by said fastening means.

11. A lighting apparatus according to claim 10 having a housing with at least one surface, in which said reflector supporting means comprises spring clip means arranged to hold the reflective means against said surface of the housing by spring pressure, and in which the spring pressure is such as to allow positional adjustment of the reflective means, and the spring clip means is positioned to allow installation and removal of the reflective means without loosening said fastening means.

* * * * *